WESLEY TANNENBAUM
RICHARD D. ADAMS
INVENTORS

BY Alden D. Redfield
Warren Kunz
ATTORNEYS

THYRATRON CIRCUIT

Filed Oct. 11, 1957 2 Sheets-Sheet 2

WESLEY TANNENBAUM
RICHARD D. ADAMS
*INVENTORS*

BY Alden O. Redfield
Warren Kunz
ATTORNEYS

United States Patent Office 2,901,611
Patented Aug. 25, 1959

2,901,611

THYRATRON CIRCUIT

Wesley Tannenbaum, Bedford, and Richard D. Adams, Billerica, Mass., assignors to Avco Manufacturing Corporation, Cincinnati, Ohio, a corporation of Delaware Application October 11, 1957, Serial No. 689,727

12 Claims. (Cl. 250—27)

Figure 1:
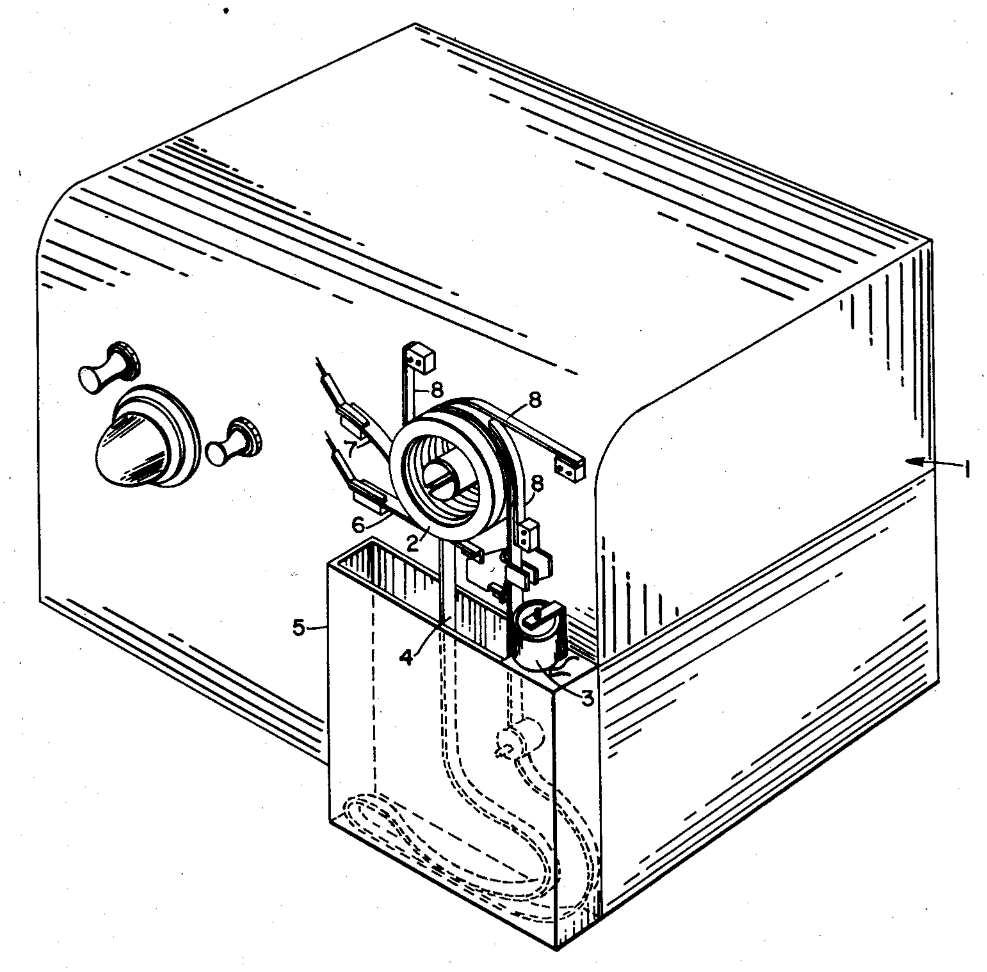

The present invention relates to an electronic circuit and more particularly to a novel circuit adapted to deliver either a large surge of current or a continuous direct current to associated circuit components, such as coils of solenoids.

More particularly the invention concerns an electronic circuit incorporating a plurality of thyratron tubes and diodes connected in parallel to deliver current to tape control devices such as used in magnetic tape recorder-reproducer apparatus.

The invention is well suited for use with equipment such as shown in presently pending application, Serial No. 681,839, now Patent No. 2,865,631, issued December 23, 1958, entitled "Means for and Method of Driving Tape," filed in the United States Patent Office on September 3, 1957, by W. Tannenbaum et al. It should be understood, however, that the present invention is not restricted in its application to use with such equipment but may also be used wherever a readily controlled source of D.C. power is required for operating equipment. For convenience, however, the invention will be described with reference to magnetic tape recorder-reproducer apparatus.

In high speed communication systems, requiring intermittent transmission of recorded information during relatively short and spaced time intervals, it is necessary to accelerate the recorder tape to full operating speed in an extremely short time period and, when required, it is necessary to stop the tape and bring it to rest almost instantaneously. Tape driving devices for such use must, therefore, be fast acting since information on the tape which passes the recorder head at speeds other than the full operating speed may be distorted or completely lost.

In drives of this type the tape may be conveniently driven by a novel magnetic capstan such as disclosed in the above mentioned application, or in the presently pending application, Serial No. 651,080, entitled "Magnetic Drive and Brake for Magnetic Tape," filed in the United States Patent Office on April 5, 1957, by W. P. Goldberg et al. As described in those applications, the capstan normally rotates at constant speed. Over the capstan is trained a piece of tape, which may be magnetic recorder tape, that can be magnetically drawn into driven engagement with the periphery of the capstan when a coil, located within the capstan, is electrically energized. In order to accelerate the tape to full operating speed almost instantaneously, it is desirable to supply a large surge of current to the coil at the beginning of the drive period. Thereafter, when the tape is up to speed, the flow of current through the coil may be reduced to a low constant level. When the tape is to be stopped, flow of current to the coil of the capstan is cut off and current is supplied to a magnetic brake which arrests the motion of the tape.

Use of large thyratron tubes for energizing the capstan and brake is not desirable because of space considerations and the slow ionization time of the large tubes.

Briefly, the present invention comprises an electronic circuit having a plurality of small thyratrons connected in parallel to supply both the large initial surge of current for accelerating the tape and the relatively smaller continuous current for driving the tape at constant speed. A combination of cross-connections and diodes may be provided to assure simultaneous operation of the thyratrons in delivering the current surge to the coil. Diodes are also provided in the circuits of those thyratrons that supply the continuous current to assure that they can be simultaneously turned on and also cut off when energization of the coil is terminated. A comparable circuit may also be used to control flow of current to the brake which arrests motion of the tape at the end of the drive period.

In view of the foregoing it will be understood that a broad object of the present invention is the provision of an improved electronic circuit.

A further object of the invention is to provide a circuit employing thyratron tubes connected for simultaneous operation in delivering current to associated circuit components.

Another object of the invention is the provision of circuit elements and conductors in combination with a plurality of thyratrons arranged to assure that the thyratrons act simultaneously both in establishing and in interrupting flow of current.

A specific object of the invention is the provision of a plurality of thyratrons which are connected for parallel operation in delivering large direct currents to associated equipment without overloading of the thyratrons.

It is also a specific object of the invention to provide an electronic circuit that is well adapted for energizing the magnetic capstan and magnetic brake of tape recorder-reproducer apparatus.

Figure 2:
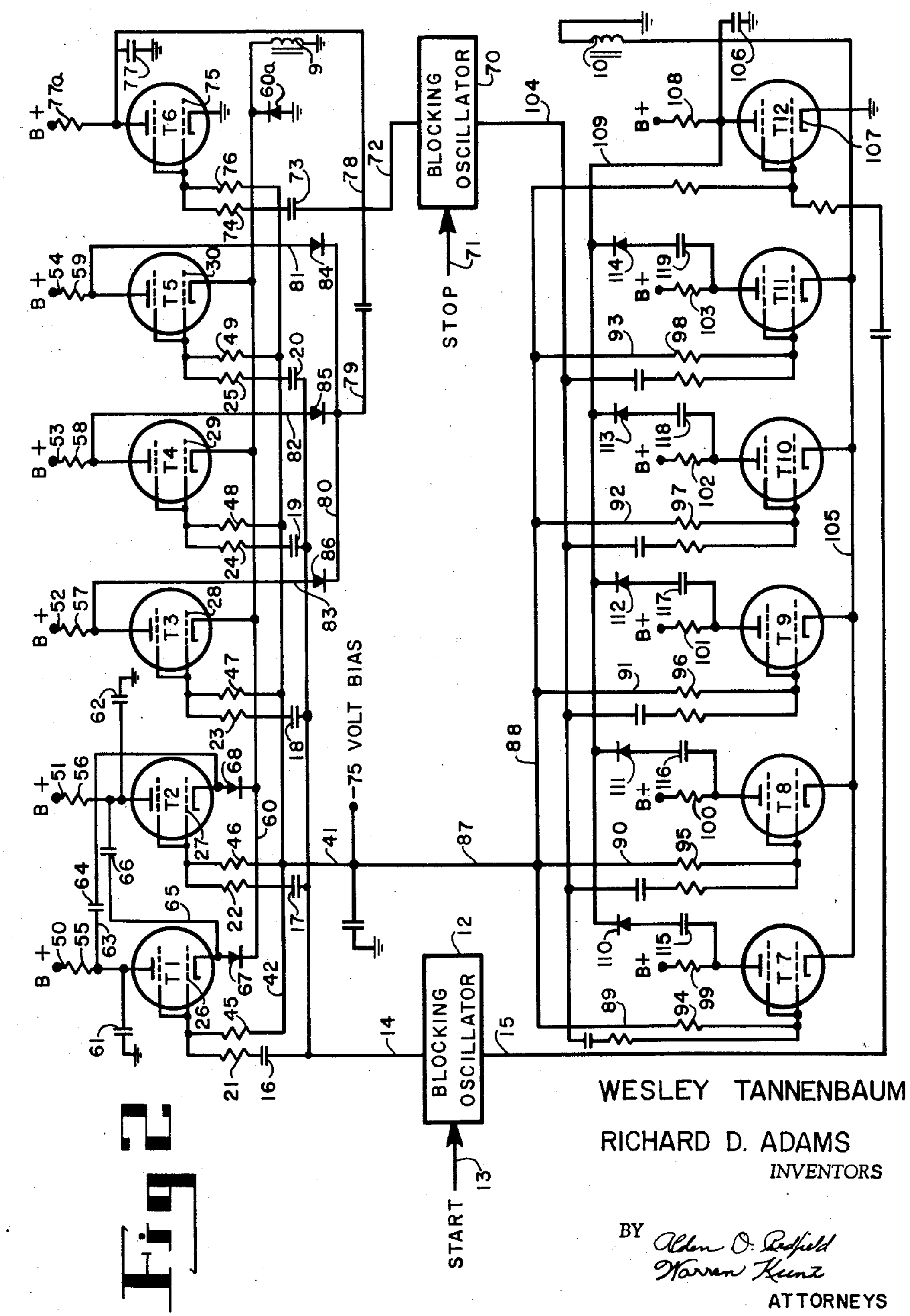

The novel features that are characteristic of the invention are set forth in the appended claims; the invention itself, however, both as to its organization and method of operation, together with additional objects and advantages thereof, will best be understood from the following description of a specific embodiment of the invention when read in conjunction with the accompanying drawings, in which:

Figure 1 is a perspective view of recorder-reproducer apparatus with which the present invention may be employed; and, Figure 2 is a diagram of the novel circuit, particularly adapted for energizing and de-energizing a magnetic capstan for driving the tape and a magnetic brake for arresting its motion, such as illustrated in Figure 1.

Directing attention first to Figure 1, there is shown tape recorder-reproducer apparatus, generally designated 1, having an improved magnetic drive capstan 2 and a magnetic brake 3. A continuous loop of magnetic recorder tape 4 is stored within a bin 5 adjacent the capstan. The tape is trained over the capstan, which is constantly rotating, and is driven by the capstan when an associated coil (not illustrated in Figure 1) is energized by the novel circuit shown in Figure 2. It will be sufficient to understand at this point that spring fingers 6 and 7 are provided to deliver current to the coil during periods when it is desirable to drive the recorder tape. When the coil is energized, the tape is magnetically drawn against the moving periphery of the capstan, and the tape, which was formerly held at rest by magnetic brake 3, is brought to full operating speed almost instantaneously. To assure more rapid response, magnetic strips 8 are positioned adjacent the exterior surface of the tape. When the capstan is energized, the strips are magnetically drawn against the tape and serve to press it into driven engagement with the capstan. Such strips are more specifically described and claimed in the before-mentioned patent.

The brake 3 comprises a cylindrical coil which, when energized, magnetically attracts the tape and arrests its motion. The capstan and brake are operated alternately, i.e., when the capstan is energized to drive the tape, the brake is de-energized; whereas, when the capstan is de-energized, the brake is energized to arrest the motion of the tape. As mentioned earlier, it is necessary that the drive be able to start and stop the tape almost instantaneously. Not only the structure of Figure 1 but also the circuit of Figure 2 are well adapted to accomplish this purpose.

Attention may now be directed to Figure 2 where the coil of the capstan is indicated at 9 and the coil of the magnetic brake is indicated at 10.

Before describing the details of the circuit, its over-all organization should be considered. Twelve electron tubes, market T1 through T12, are shown in the diagram. Each is a special-purpose, gas-filled thyrathron tube, type 2D21. Tubes T1 through T6 control flow of current through capstan winding 9 while tubes T7 through T12 perform this function with respect to the brake winding 10. As will be described shortly, tubes T1 and T2 are used to produce a large initial surge of current through winding 9 to accelerate the magnetic tape. Tubes T3—T5 provide a lesser and steady flow of current during the time that the capstan is driving the tape at constant speed. Finally, tube T6 is used to cut off tubes T3—T5 to de-energize the capstan.

Tubes T7—T11 control flow of current through the winding 10 of the magnetic brake during the time that it is energized. Tube T12 may be triggered to cut off these tubes and de-energize the brake.

Details of the circuit will now be considered. A blocking oscillator of conventional design is indicated at 12. As indicated by the arrow at 13, a 20-volt positive starting pulse is supplied to the oscillator which delivers a 200-volt positive pulse to conductors 14 and 15 for energizing the capstan and de-energizing the brake. The positive pulse is fed through blocking condensers 16—20 and resistors 21—25 to the grids 26—30 of tubes T1—T5, respectively. This positive pulse overbanlaces the 75-volt negative bias which is normally impressed on the grids through conductors 41—42 and grid resistors 45—49.

The positive potential impressed on the grids causes current to flow from the B+ power supply 50—54 (450 volts) through resistors 55—59 to the plates and thence to the cathodes of the tubes T1—T5. Current from the cathodes flows through conductor 60 to winding 9 of the capstan.

In order to provide a large initial surge of current through the winding, condensers 61 and 62 are connected to the plates of tubes T1 and T2, respectively. When these tubes are triggered, energy stored in these condensers flows through the tubes and the winding 9. Discharge of these condensers is synchronized by cross-connections between the plate and cathode of each of the tubes. To illustrate, conductor 63 connects the plate of tube T1 to the cathode of tube T2. Coupling condenser 64 is provided in this conductor. In a similar manner, conductor 65 interconnects the plate of tube T2 with the cathode of tube T1 and includes coupling condenser 66. It will also be noted that silicon junction rectifiers 67 and 68 are connected to the cathodes of tubes T1 and T2, respectively, and to conductor 60. Current from these tubes must flow through the associated rectifiers before passing through conductor 60 to winding 9 of the capstan.

The function of the cross-connections and the rectifiers can now be considered. Assuming that tube T1 tends to pass current in advance of T2, the potential on its plate will tend to drop while the potential at its cathode will tend to rise during the initial surge of current to conductor 60. Assuming a B+ potential of 450 volts, the potential at the cathode of tube T1 would approach 442 volts at the instant that the tube becomes conductive. In other words, allowing for an 8-volt drop through the tube while it is conductive, the surge of current rapidly raises the cathode potential to a high value which gradually decays toward ground potential as the surge passes through coil 9 and steady-state conditions are established. As the cathode potential decays, so does the plate potential as flow of current for replenishing the charge on condenser 61 gradually establishes an IR drop across resistor 55.

But for the presence of rectifier 68, the high momentary potential of the cathode of T1 would be communicated to the cathode of T2 preventing it from becoming conductive. The rectifier, however, prevents this from happening. Further, the negative potential gradient of the plate of T1 during its initial conducting period is communicated to the cathode of T2 assuring a sufficient potential drop across T2 to permit it to become conductive.

Rectifier 67 and cross connection 65 act similarly to prevent potential build up on the cathode of tube T1 if tube T2 first begins to conduct. The net effect is that the tubes influence one another to discharge condensers 61 and 62 simultaneously.

Without cross connections 63 and 65, the circuit may be erratic in operation; hence, their use is desirable, although not necessary, for all applications.

After discharge of condensers 61 and 62, the potential on the plates of tubes T1 and T2 drops to a value below the ionizing potential of the gas in the tubes and the flow of current is cut off. The potential on the plates cannot build up fast enough to reestablish current flow during the period of positive bias of the associated grids because of the time lag introduced by the relatively large resistors 55 and 56 and large condensers 61 and 62. Flow of current through tubes T3—T5, initiated by the positive pulse from blocking oscillator 12, continues, however, providing the magnetic field for the capstan which drives the tape at constant speed.

In order to stop the driving action of the capstan, a blocking oscillator 70 is provided to which a 20-volt positive control pulse may be supplied, as indicated at 71. This produces a 200-volt positive pulse in conductor 72 which is supplied through condenser 73 and resistor 74 to the grid 75 of tube T6. This pulse overcomes the negative bias impressed on the grid through resistor 76 and causes the tube T6 to become conductive, discharging condenser 77. Bearing in mind that the cathode of T6 is grounded while the cathodes of T3—T5 are connected to coil 9 which has some resistance, it will be apparent that the plate potential of tube T6 asymptotically approaches a value less than the steady-state plate potential of tubes T3—T5. This slight reduction in potential, when communicated through conductors 78—83 to the plates of these latter tubes, causes them to fall below cut-off and flow of current to coil 9 is terminated.

Diode **60*a* is connected across coil 9** and shorts to ground negative voltage surges resulting from the collapse of the field of the coil, thereby preventing the surges from reaching the cathodes of tubes T3—T5 and opposing cut-off by tube T6.

After discharge of condenser 77, conduction of T6 is terminated by current starvation which results from the large size of the condenser and the plate load resistor **77*a***.

Rectifiers 84—86 are provided in conductors 81—83 to prevent the voltage drop of the plate of the first tube T3—T5 which becomes conductive from being communicated to the plates of the remaining tubes, thereby assuring that all tubes will become conductive simultaneously when subjected to the positive control pulse. These rectifiers also prevent voltage surges from the plate of one tube to the plate of another, which might prevent it from falling below cut-off when tube T6 terminates operation. To illustrate, assume that the plate potential of tube T3 were the first to fall below cut-off. After cut-off, the plate would immediately begin to rise toward B+ potential. By virtue of conductors 80—83, this potential rise would be communicated to the plates of tubes T4 and T5 which would thereby be prevented from falling below cut-off. The provision of rectifiers 84—86 prevents such voltage surges from defeating the action of tube T6.

The absence of cross-connections, such as 63 and 65, between tubes T3—T5 will be noted. It is possible to eliminate such cross-connections because the peak current surge through any of the tubes T3—T5 never exceeds .100 amp., in contrast to peak currents of 150 amps. through tubes T1—T2. Such small current surges are too small to significantly influence the cathodes of the other thyratrons and do not prevent simultaneous conduction of these tubes.

So far, only the arrangement and operation of the circuit for the capstan has been considered. The circuit for controlling the brake may be identical; however, a slightly modified circuit is illustrated which may be used where the time for stopping the tape is not as critical as the time for starting it. In this circuit tubes T7—T11 conduct continuously during the time that the brake winding 10 is energized. These tubes are rendered conductive by a 200-volt positive pulse supplied by blocking oscillator 70 at the time the stop signal 71 is impressed upon it. Energization of the brake winding is terminated by driving the plate potential of these tubes below cut-off. This is done by tube T12 in response to a 200-volt pulse supplied by oscillator 12 through conductor 15 to the grid of tube T12.

Briefly, the circuit is arranged as follows:

A negative 75-volt bias is impressed on the grid of each tube through conductors 87—93 and grid resistors 94—98. The B+ power supply is connected to the plate of each tube through plate load resistors 99—103 in conventional manner. The 200-volt positive pulse for energizing the brake is supplied to the grids of tubes T7—T11 by the blocking oscillator 70 through conductor 104 when the stop signal 71 is supplied to the oscillator. This pulse drives these tubes into the conducting region and current flows from the B+ supply to conductor 105 which is connected to winding 10 of the brake.

The tubes remain conducting until the start pulse is impressed on the grid of tube T12 by blocking oscillator 12, overcoming the negative bias applied to tube T12 through conductor 109. This tube then conducts, discharging condenser 106, and by virtue of its grounded cathode 107, develops a plate potential less than the steady-state plate potential of tube T7—T11. The drop of potential is communicated from the plate of T12 to the plates of tubes T7—T11 by conductor 109, rectifiers 110—114 and coupling condensers 115—119, driving the tubes below cut-off. Current flow through tube T12 is eventually terminated by current starvation made possible by the large size of condenser 106 and resistor 108.

Rectifiers 110—114 function to assure simultaneous conduction of tubes T7—T11 and simultaneous cut-off in the same manner as described with reference to rectifiers 84—86.

Thus, in summary, the pulse from blocking oscillator 12 energizes the capstan and de-energizes the brake, while the pulse from blocking oscillator 70 de-energizes the capstan and energizes the brake. It will be appreciated that the use of blocking oscillators is optional and that other means may be used, if desired, to provide the necessary pulses for triggering the thyratron tubes.

Broadly, this invention teaches means for assuring simultaneous operation of thyratrons in establishing a large current flow through an associated circuit component. Further, the invention teaches means for simultaneously terminating current flow through a plurality of thyratrons by dropping their plate potentials below cut-off. This preferably is done with the aid of a separate thyratron but could be done by connecting the plates to any available low potential source.

With respect to both aspects of the invention, it will be noted that rectifiers are instrumental in assuring simultaneous operation of the tubes. These preferably are silicon junction semi-conductors, although other diodes having suitable voltage characteristics and current ratings, could be used.

Obviously the circuit is not limited to use with coils, such as those of the capstan and brake, but can be used wherever thyratron control of a current supply is desirable. It will also be recognized that various portions of the circuit can be used separately. This, if equipment requires a single large surge of current, the circuit portion including tubes T1 and T2 could be used alone. Further, for lower value, continuous currents, the circuit of tubes T3—T6 could be used alone. Obviously, other variations in the circuit could be made for particular applications within the teaching of this invention.

The following parameters are recommended for use in the control circuit that has been described:

| | |
|---|---|
| Capstan winding **9** | 100 turns of No. 18 insulated copper wire. |
| T1—T12 vacuum tubes | Type 2D21. |
| Brake winding **10** | 100 turns of No. 18 insulated copper wire. |
| Condensers **16—20** | 1.0 microfarad. |
| Resistors **21—25** | 10,000 oms, ½ watt. |
| Resistors **45—49** | 270,000 ohms, ½ watt. |
| Resistors **55—59** | 5,000 ohms, 5 watt. |
| Condensers **61—62** | 10 microfarad, 450 volt. |
| Condenser **64** | 500 micromicrofarad. |
| Condenser **66** | 500 micromicrofarad. |
| Condenser **73** | .01 microfarad. |
| Resistor **74** | 10,000 ohms, ½ watt. |
| Resistor **76** | 270,000 ohms, ½ watt. |
| Condenser **77** | 8 microfarad, 450 volt. |
| Resistors **94—98** | 470,000 ohms, ½ watt. |
| Resistors **99—103** | 5,000 ohms, 50 watt. |
| Condenser **106** | 8 microfarad, 450 volt. |
| Resistor **108** | 5,000 ohms, 5 watt. |
| Condensers **115—119** | .1 microfarad, 600 volt. |
| Rectifiers (diodes) **67, 68, 84—86, 110—114** | Silicon junction diodes rated at 500 milliamps. |

Having described a preferred embodiment of our invention, we claim:

1. An electronic circuit for delivering a surge of current to a load comprising a pair of thyratron tubes each connected in parallel to a direct current source, each thyratron tube including a plate, a cathode, and a control grid therebetween; cross-connections interconnecting the plate of one tube to the cathode of the other of said tubes, each cross-connection including a blocking condenser; a rectifier connected to each cathode; a common conductor connecting said rectifiers to a common load; and a condenser connected to the plate of each of said thyratron tubes for discharging current through said tubes and rectifiers to the load when the grids of said tubes are biased to render said tubes conductive.

2. An electronic circuit for delivering a surge of current to a load comprising a pair of thyratron tubes each including a plate and a cathode and a control grid therebetween, the plates of said tubes being connected to a direct current source, a rectifier connected to the cathode of each of said tubes, said rectifiers being connected to a common load, electrical energy storage means connected to the plate of each tube, cross-connections for impressing the potential gradients of the plate of one tube on the cathode of the other of said tubes, and grid bias control means to initiate current flow through said tubes.

3. Apparatus as defined in claim 2 in which said rectifiers are silicon junction diodes.

4. An electronic circuit for delivering a surge of current to a load comprising a plurality of thyratron tubes each including a plate and a cathode and a control grid, the plates of said tubes being connected to a direct current source, a rectifier connected to the cathode of each of said tubes, said rectifiers being connected to a common load, electrical energy storage means connected to the plate of each tube, cross-connections for impressing the potential gradients of the plate of each tube on the cathodes of the others of said tubes, and means for biasing the grids of said tubes to initiate current flow therethrough.

5. The circuit as defined in claim 4 in which said rectifiers are silicon junction diodes.

6. In combination in an electronic circuit for supplying current to a grounded load, a plurality of thyratron tubes connected in parallel to a direct current source, each thyratron tube including a plate and a cathode with a control grid therebetween, a conductor connected in common to the cathodes of said tubes and to the load, means for applying a negative bias to the grid of each thyratron tube to render it non-conductive, means for impressing a positive control pulse on the grid of each tube to overcome the negative bias and to initiate current flow from the direct current source simultaneously through said tubes to the load, another thyratron tube having a plate, a control grid, and a grounded cathode, the plate of said last-named thyratron tube being connected to said direct current source, means for biasing the grid of said last-named tube to conduct current from the source to ground, conductors for impressing the plate potential of said last-named thyratron tube upon the plates of said first-named thyratron tubes whereby said first-mentioned tubes may be driven below cut-off, and rectifiers in said last-mentioned conductors to prevent voltage surges between the plates of said first-mentioned plurality of tubes during the time that said last-mentioned tube is conducting.

7. In combination in an electronic circuit for controlling current flow through a load, a plurality of thyratron tubes connected in parallel to a direct current source, each tube including a plate and a cathode and a control grid therebetween, the cathodes of said tubes being connected to a common load, grid biasing means to render said tubes simultaneously conductive, and means for simultaneously rendering said tubes non-conductive, said means comprising a source of low potential, conductors interconnecting said low potential source and the plates of said tubes, and rectifiers interposed in said conductors between the plate of each tube and said low potential source.

8. An electronic circuit for delivering a large initial surge of current and then a steady smaller flow of current to a load comprising a plurality of thyratron tubes each including a plate, a cathode, and a control grid, the plates of said tubes being connected to resistors which are connected to a direct current source, rectifiers connected to the cathodes of two of said tubes, cross-connections interconnecting the plates and cathodes of said two tubes, electrical energy storage means connected to the plates of said two tubes, a conductor connected to said rectifiers and to the cathodes of the remainder of said tubes for conveying current to the load, grid biasing means for rendering all of said tubes conductive simultaneously, said two tubes becoming non-conductive through current starvation, and means for simultaneously rendering the remainder of said tubes non-conductive, said means comprising a source of low potential, conductors interconnecting said low potential source and the plates of the remainder of said tubes, and rectifiers interposed in said conductors between the plate of each of the remainder of said tubes and said low potential source.

9. The circuit as defined in claim 8 in which said low potential source comprises a thyratron tube having a grounded cathode, a plate, and a grid; and a condenser connected to said plate, said grid being biased to establish current flow through said tube whereby said condenser is discharged and the potential of said plate is dropped below the steady-state potential of the plates of the remainder of said thyratron tubes.

10. In combination in an electronic circuit for delivering a large initial surge of current followed by a smaller constant current to a load comprising a plurality of thyratron tubes connected in parallel to a direct current source; grid control means for triggering each tube and rendering it conductive when subjected to a control pulse; said thyratron tubes comprising two groups, both of which are connected by a common conductor to the load; said first group of thyratron tubes having associated with them electrical energy storage means for discharge therethrough when said thyratron tubes are rendered conductive; cross-connections between the plates and cathodes of said first group of thyratron tubes and rectifiers between the cathodes of said tubes and said conductor connected to the load; said first group of thyratron tubes, upon being triggered, discharging said electrical energy storage means through said rectifiers to supply a current surge to the load; said second group of said tubes, upon being triggered, passing a constant low level current to said conductor and the load; and means for simultaneously rendering said second group of tubes non-conducting, said means comprising a source of low potential, conductors interconnecting said low potential source and the plates of said second group of tubes, and rectifiers interposed in said last-named conductors between the plate of each tube and said low potential source.

11. The circuit as defined in claim 10 in which said low potential source comprises a thyratron tube having a grounded cathode, a plate and a grid; and a condenser connected to said plate, said grid being biased to establish current flow through said tube whereby said condenser is discharged and the potential of said plate is dropped below the steady-state potential of the plates of said second group of thyratron tubes.

12. An electronic circuit for delivering a surge of current to a load comprising a plurality of thyratron tubes, each including a plate and a cathode and a control grid, the plates of said tubes being connected to a direct current source, a rectifier connected to the cathode of each of said tubes, said rectifiers being connected to a common load, electrical energy storage means connected to the plate of each tube, and means for biasing the grids of said tubes to initiate current flow therethrough simultaneously.

References Cited in the file of this patent

UNITED STATES PATENTS

| | | |
|---|---|---|
| 2,520,478 | Stanbach et al. | Aug. 29, 1950 |
| 2,719,227 | Gordon | Sept. 27, 1955 |